(12) United States Patent
Balchandran et al.

(10) Patent No.: US 7,835,911 B2
(45) Date of Patent: Nov. 16, 2010

(54) METHOD AND SYSTEM FOR AUTOMATICALLY BUILDING NATURAL LANGUAGE UNDERSTANDING MODELS

(75) Inventors: Rajesh Balchandran, Congers, NY (US); Linda M. Boyer, Ossining, NY (US)

(73) Assignee: Nuance Communications, Inc., Burlington, MA (US)

( * ) Notice: Subject to any disclaimer, the term of this patent is extended or adjusted under 35 U.S.C. 154(b) by 1099 days.

(21) Appl. No.: 11/324,057

(22) Filed: Dec. 30, 2005

(65) Prior Publication Data

US 2007/0156392 A1 Jul. 5, 2007

(51) Int. Cl.
*G10L 15/00* (2006.01)
*G10L 15/18* (2006.01)
*G10L 21/00* (2006.01)

(52) U.S. Cl. .......................... 704/257; 704/9; 704/243; 704/270; 704/275

(58) Field of Classification Search ............. 704/1, 704/9, 10, 257, 270, 270.1, 243–244
See application file for complete search history.

(56) References Cited

U.S. PATENT DOCUMENTS

| | | | |
|---|---|---|---|
| 5,386,556 A | 1/1995 | Hedin et al. | |
| 5,613,036 A * | 3/1997 | Strong | 704/243 |
| 5,680,511 A * | 10/1997 | Baker et al. | 704/257 |
| 5,794,050 A | 8/1998 | Dahlgren et al. | |
| 5,806,032 A | 9/1998 | Sproat | |
| 5,982,933 A * | 11/1999 | Yoshii et al. | 382/226 |
| 5,995,918 A * | 11/1999 | Kendall et al. | 704/1 |
| 6,173,266 B1 * | 1/2001 | Marx et al. | 704/270 |
| 6,188,976 B1 | 2/2001 | Ramaswamy et al. | |
| 6,311,150 B1 | 10/2001 | Ramaswamy et al. | |
| 6,418,431 B1 * | 7/2002 | Mahajan et al. | 707/4 |
| 6,434,523 B1 * | 8/2002 | Monaco | 704/257 |
| 6,526,380 B1 * | 2/2003 | Thelen et al. | 704/251 |
| 6,529,902 B1 * | 3/2003 | Kanevsky et al. | 707/5 |
| 6,754,626 B2 | 6/2004 | Epstein | |
| 6,839,671 B2 * | 1/2005 | Attwater et al. | 704/255 |
| 6,904,402 B1 * | 6/2005 | Wang et al. | 704/10 |
| 6,928,407 B2 * | 8/2005 | Ponceleon et al. | 704/253 |
| 7,031,908 B1 * | 4/2006 | Huang et al. | 704/9 |
| 7,080,004 B2 * | 7/2006 | Wang et al. | 704/9 |
| 7,092,888 B1 * | 8/2006 | McCarthy et al. | 704/277 |
| 7,099,809 B2 * | 8/2006 | Dori | 703/6 |

(Continued)

*Primary Examiner*—James S Wozniak
(74) *Attorney, Agent, or Firm*—Wolf, Greenfield & Sacks, P.C.

(57) ABSTRACT

The invention disclosed herein concerns a system (100) and method (600) for building a language model representation of an NLU application. The method 500 can include categorizing an NLU application domain (602), classifying a corpus in view of the categorization (604), and training at least one language model in view of the classification (606). The categorization produces a hierarchical tree of categories, subcategories and end targets across one or more features for interpreting one or more natural language input requests. During development of an NLU application, a developer assigns sentences of the NLU application to categories, subcategories or end targets across one or more features for associating each sentence with desire interpretations. A language model builder (140) iteratively builds multiple language models for this sentence data, and iteratively evaluating them against a test corpus, partitioning the data based on the categorization and rebuilding models, so as to produce an optimal configuration of language models to interpret and respond to language input requests for the NLU application.

20 Claims, 9 Drawing Sheets

U.S. PATENT DOCUMENTS

| | | | |
|---|---|---|---|
| 7,216,073 B2 * | 5/2007 | Lavi et al. | 704/9 |
| 7,440,895 B1 * | 10/2008 | Miller et al. | 704/244 |
| 7,533,023 B2 * | 5/2009 | Veprek et al. | 704/270.1 |
| 2002/0169595 A1 * | 11/2002 | Agichtein et al. | 704/9 |
| 2003/0091163 A1 | 5/2003 | Attwater et al. | |
| 2003/0212544 A1 | 11/2003 | Acero et al. | |
| 2004/0249628 A1 * | 12/2004 | Chelba et al. | 704/4 |
| 2004/0249632 A1 | 12/2004 | Chacon | |
| 2005/0075874 A1 | 4/2005 | Balchandran et al. | |
| 2005/0075878 A1 | 4/2005 | Balchandran et al. | |
| 2006/0074671 A1 * | 4/2006 | Farmaner et al. | 704/257 |

* cited by examiner

METHOD AND SYSTEM FOR AUTOMATICALLY BUILDING NATURAL LANGUAGE UNDERSTANDING MODELS

BACKGROUND OF THE INVENTION

1. Technical Field

This invention relates to the field of natural language understanding, and more particularly, to developing systems for building natural language models.

2. Description of the Related Art

The ability to classify natural language input forms the basis for many "understanding" applications. An example of this would be a natural language call routing application where calls are transferred to the appropriate customer representative or system based on the user request. In many Natural Language Understanding (NLU) applications, there is a need to classify the user request, specified in natural language, into one or more of several classes or actions. Such input can be provided as spoken words or typed text. For example, in an interactive voice response (IVR) application such as a call routing application, a user can submit spoken input to be directed to various destinations such as a customer service representative or a service offering. The IVR can select a destination which depends on the meaning or interpretation of the user's request. Notably, the IVR should sufficiently understand the user's request to correctly route the call. For example, the user request "I have a problem with my printer" should be routed to a printer specialist, whereas "I forgot my password" should be routed to a password administrator. Another example is a natural language dialog processing system that interprets user requests for information or transactions. In such systems, the classification serves to identify the specific action that is being requested by the user. For example, in a mutual fund trading system a request like "I would like to buy 50 shares of the growth fund" would be processed as a fund purchase request whereas a request like, "How many shares do I have in the growth fund?" would be processed as a request for information about a particular fund.

A conventional way to classify natural language input is through the use of rules or grammars that map pre-defined input into specific classes or actions. While grammars are very powerful and effective, they become more complex as the scope of the application grows and can therefore become difficult to write and debug. In addition, when the user request is stated in a way that is not covered by the grammar, the request may be rejected, limiting the extent of acceptable "natural" language input. Also, linguistic skills are generally required to write unambiguous grammars, whereby the required skill level necessarily increases as the application becomes more complex.

One approach to training NLU models for improving interpretation abilities is to collect a corpus of domain specific sentences containing probable user requests and to classify the user requests based on the implied actions of the sentence. For example, in a call routing application, example sentences associated with a routing destination can be used to train NLU models. The user requests can be categorized into a single monolithic statistical language model that captures the mapping between the sentences in the entire corpus and their implied actions. During program execution, when a user is interacting with the NLU system, the single statistical language model can classify the sentences into probable actions. For example, the probable action in a call routing destination is the connection of a user to a routing destination.

Building a natural language understanding (NLU) system generally requires training a large corpus to properly interpret broad and narrow language requests. A developer of an NLU system may be required to find training data relevant to the application. The task of identifying and classifying the training data can be a time consuming and tedious process. The developer must generally manually search through a database, classify the data and manually train the language models. The developer collects a corpus of domain-specific sentences of likely user requests (referred to as training data) and then classifies the sentences based on the actions implied in the sentence. This corpus is then typically used to build a single monolithic statistical language model that captures the mapping between the sentences in the entire corpus and their implied action or actions. At runtime, the statistical model is used to classify sentences into likely actions. While this monolithic statistical model approach to action classification can be quite effective, it has certain limitations, especially as the number of actions increases.

One disadvantage of a single monolithic language model is that as the number of actions, or targets, increases, the amount of required data can increase. In order for a language model to perform more sophisticated tasks, it may be necessary to provide more data which can accordingly make training and tuning more complex. As the amount of data and number of actions increase, there is overlap between actions leading to confusion between actions and thereby increasing the misinterpretation of sentences leading to lower classification accuracies. Additionally, a monolithic model is not very effective in identifying multiple pieces of information from a single request or obtaining precise levels of classification.

Also, capturing all the nuances of an application domain using a single monolithic statistical model is not straight forward. Accordingly, a developer must generally build and design combinations of multiple statistical models that work together to interpret natural language input which makes developing such applications more complex. Accordingly, identifying the optimal combination of models becomes more challenging as the complexity grows. The effort requires a higher degree of customization and skill level from the developer. This can complicate the development of natural language understanding applications. The developer can be required to specifically train the models by identifying data for the broad and narrow level models. In addition, the developer can be required to combine various combinations of models for achieving acceptable interpretation performance.

With multiple models, various configurations can each provide various improvements or degradations in performance. Too few models may not be capable of capturing all the details contained in user requests, whereas with too many models there may be insufficient data to train all of them resulting in sparsely trained models which yield poor accuracy. The developer is therefore burdened with responsibility of identifying an optimal number of models each with an associated set of training data that needs to be selected to properly train the individual models. In practice, the developer may be required to know a priori how many models to build, how to partition the data, or how to configure the sequencing of the models. The task can be quite difficult thereby presenting a need for automating the selection of the training data, the optimal number of models, and the optimal configuration of the models for producing the highest performance with respect to the application domain. A need therefore exists for a reliable classification approach which is highly accurate and that is flexible with respect to interpreting user input, while at the same time reduces the skill level and time required of a developer to create the model.

SUMMARY OF THE INVENTION

The invention disclosed herein concerns a system and method for automatically generating a set of language models for an NLU application. The language models are trained to maximize an interpretation performance of the NLU application, which results in an optimal configuration of the language models. The set of language models are configured into an optimal combination based on an application categorization and classification of a language model representation. The language model representation interprets language input requests and identifies actions for responding to a language input request. Categorizing a natural language understanding (NLU) application, referred to as application categorization, includes representing the application as a hierarchical tree of categories, sub-categories and end targets for one or more features or types of interpretation.

Multiple language models can be generated at different levels during the generation of the optimal configuration. For example, language models can be recursively built under topics within the application categorization hierarchy to produce the optimal configuration. High-level language models can be evaluated for their interpretation performance. If all targets are not correctly interpreted, lower-level language modes can be built from the high-level language model to maximize the interpretation of those targets. The process of partitioning language models can continue down into the application categorization hierarchy for further resolving misinterpretations. The process maximizes a language interpretation performance and produces a configuration of the language models called the language model representation that is optimal for a classified corpus of the NLU application.

During development of the NLU application, a developer categorizes sentences of the NLU application and associates each sentence with targets that represent a correct interpretation of the sentence. The association is performed during a classification process which results in the automatic training of language models. The language models learn multiple associations between sentences and targets for correctly responding to a language input request. This allows multiple pieces of information to be provided by the language models when responding to language input requests. For example, at runtime, a language input request (e.g. a spoken utterance) is passed through an optimal configuration specified by the language model representation and a set of targets are identified. The language models identify targets with the highest corresponding interpretation accuracy. The language model representation can identify an action for responding to the language input request. The automatic process can reduce the time to generate the language models in comparison to manually generating the language models. The automatic process can result in higher runtime accuracy than manually training the language models.

Embodiments of the invention concern a method for building a language model representation. The method can include categorizing a natural language understanding (NLU) application, classifying a corpus for producing a classified corpus, and training at least one language model in view of the classified corpus. The categorizing can further include identifying topics within the natural language understanding application, and presenting the topics with associated targets within the application categorization. The application categorization describes all of the potential targets in the NLU application. Topics can be partitioned into broad categories, and then partitioned into categories and sub-categories, and further down to end targets. For example, a corpus sentence can be classified as a feature, a category, or a target of the application categorization. The classifying can partition a language model representation of the NLU application based on the categorizing. For example, sentences falling under different categories within the application categorization can be partitioned into separate language models. Language models can be generated for each partitioning of the language model representation as sentences are broken down into word elements within the NLU application hierarchy. The training can produce an optimal configuration of language models within the application categorization based on the classification. For example, a sequence of language models can be configured together or separately based on the classification of sentences within an NLU corpus for producing a language model representation. Each language model can interpret and respond to a language input request.

In one aspect, the training produces language models that learn associations between categories, sub-categories, and end targets across multiple features within the application categorization, such that a language input request is identified, using a language model, with at least one action that corresponds to a target. For example the target can be an action, such as a voice information response, associated with an NLU application topic. The step of classifying the corpus can further include classifying all corpus sentences in the NLU application, and associating each corpus sentence with at least one target in the application categorization for providing a correct interpretation of the corpus sentence. The classifying can further include associating a sentence with multiple targets, such that a user of the natural language understanding application entering a language input request can receive multiple pieces of information from the language model representation.

In another aspect, a visual representation of the language model representation can be produced for visually categorizing and visually classifying the natural language understanding application. A developer can categorize the NLU application using a visual editor to drag and drop a sentence into at least one feature, category, or target of the visual representation. For example, the categorization can include using a graphical user interface to move sentences from an NLU corpus to the application categorization. A developer can visually enter sentences into at least one category and into at least one target of the visual representation. A developer can enter an example sentence into a node in the visual representation, and the example sentence is automatically classified with category targets above the node in the visual representation. For example, the application categorization can be considered a tree-like information structure containing branches and leaves, wherein the leaves can be end targets along a branch.

Training the language models within the language model representation can include building a first language model from the classified corpus, evaluating an interpretation accuracy of the first language model, and building a second language model if a target of the first language model is not correctly identified. Evaluating the interpretation accuracy can include identifying targets of the first language model and testing for correct recognition of these targets. The training can be recursively applied across topics, features, and categories within the language mode representation for producing multiple models. The performance evaluation can be an iterative process that generates more language models until the performance accuracy for each target within the language model representation is acceptable. The second language model can be built by dividing the classified corpus at a branch within the application categorization and building a language model for the branch. The process of dividing the corpus can generate a new sequence of language models thereby generating a configuration describing the connection of the language models. The configuration can be saved in a configuration file that describes the sequential interconnection of each language model for interpreting and responding to a language input request. Notably, the language models are partitioned within the language model representation hierarchy such that each language model achieves an acceptable interpretation performance accuracy.

During training the data within the application categorization can be partitioned in view of the hierarchical categorization. The method can generate more models at each category level, working downwards through the hierarchy, and computing the performance accuracy for the combination of models at each category level until an optimal performance is achieved. Optimal performance can be described as that performance which, given the restricted number of categories and target levels within the language model representation, produces the highest accuracy for all possible configurations of the given category levels. In one aspect, the step of evaluating can be an iterative process that generates more models until the performance accuracy reaches a threshold. The threshold can be a performance criterion established during testing. The process of generating the optimal language models in view of the possible set of available configurations captures the interconnection between various models for properly interpreting a user's request.

The performance accuracy can be assessed by passing sentences of a test set through the language models based on a sequence described by the configuration file. The language model representation includes topics of the NLU application that are categorized under features, categories, and targets. A feature can contain multiple categories and each category can contain multiple targets that are each associated with an action. A branch within the language model can be considered that section of the language model below a certain feature or category. A history of the performance accuracy can be logged for each new configuration. A historic performance accuracy of a previous configuration can be compared to a new performance accuracy of the new configuration. A previous configuration can be reverted to if a new performance accuracy is inferior to a historic performance accuracy.

Embodiments of the invention also concern a natural language understanding (NLU) system. The system can include an application categorization for categorizing an NLU application, a classifier for partitioning an NLU database corpus, and a language model builder for creating a language model for each partitioning of the corpus. The application categorization can include topics of the natural language understanding application that are presented as targets. The classifier can partition the application categorization based on a categorization of the NLU application. The language mode builder can produce an optimal configuration of language models called the language model representation based on a classification of the application categorization. In one arrangement, the NLU system can be a visual toolkit having a graphical user interface (GUI) for visually presenting the language model representation. A user can categorize and classify sentences of an NLU application through the visual toolkit. The visual toolkit allows developers to drag and drop sentences into the language model through the GUI.

The invention also includes a natural language understanding (NLU) dialog processing system. The system can include an NLU application domain categorizing at least one target, at least one NLU model level within a multiple model corresponding to the target, a language model representation defining at least one configuration of said multiple model, where the configuration can include at least one model level, and a graphical user interface (GUI) for presenting said language model representation to a developer for building an NLU application. The configuring of an NLU model level can be hidden from the developer and considered optimal for at least one NLU model level.

The invention also concerns a visual toolkit for developing an NLU application. The toolkit can include an application categorization of an NLU application domain, and a graphical user interface (GUI) for presenting the language model representation. For example, a developer can enter a training dataset for strengthening links within at least one configuration of a multiple model containing at least one model level. In practice, a user can enter a request into the NLU application for receiving an action which corresponds to a link within at least one configuration. A link can be the connection between two targets at the association level of the connection between two models for producing a configuration at the model building level. In one arrangement, the user request can be processed through at least one configuration for yielding a classification result corresponding to that configuration, and the configuration with the highest classification result is selected for converting the request to an action.

In one arrangement, the language model representation generates an intermediate classification result with confidence scores at each model level. The language model representation can submit to a higher model level if the confidence score at a lower model level is below a threshold for properly interpreting and responding to a user request. For example, a low-level model can initially attempt to address a user request, and if the low-level model is unable to interpret the request, the interpretation task can be delegated to a higher level model. After the language model representation is classified trained, received user spoken utterances can be processed using the resulting language model representation. One or more language models within the language model representation can be identified which correspond to one or more received user spoken utterances. The identified language models can be used to process subsequent received user spoken utterances for directing the user to a target. For example, the target can be a routing destination or a service target.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Figure 1:
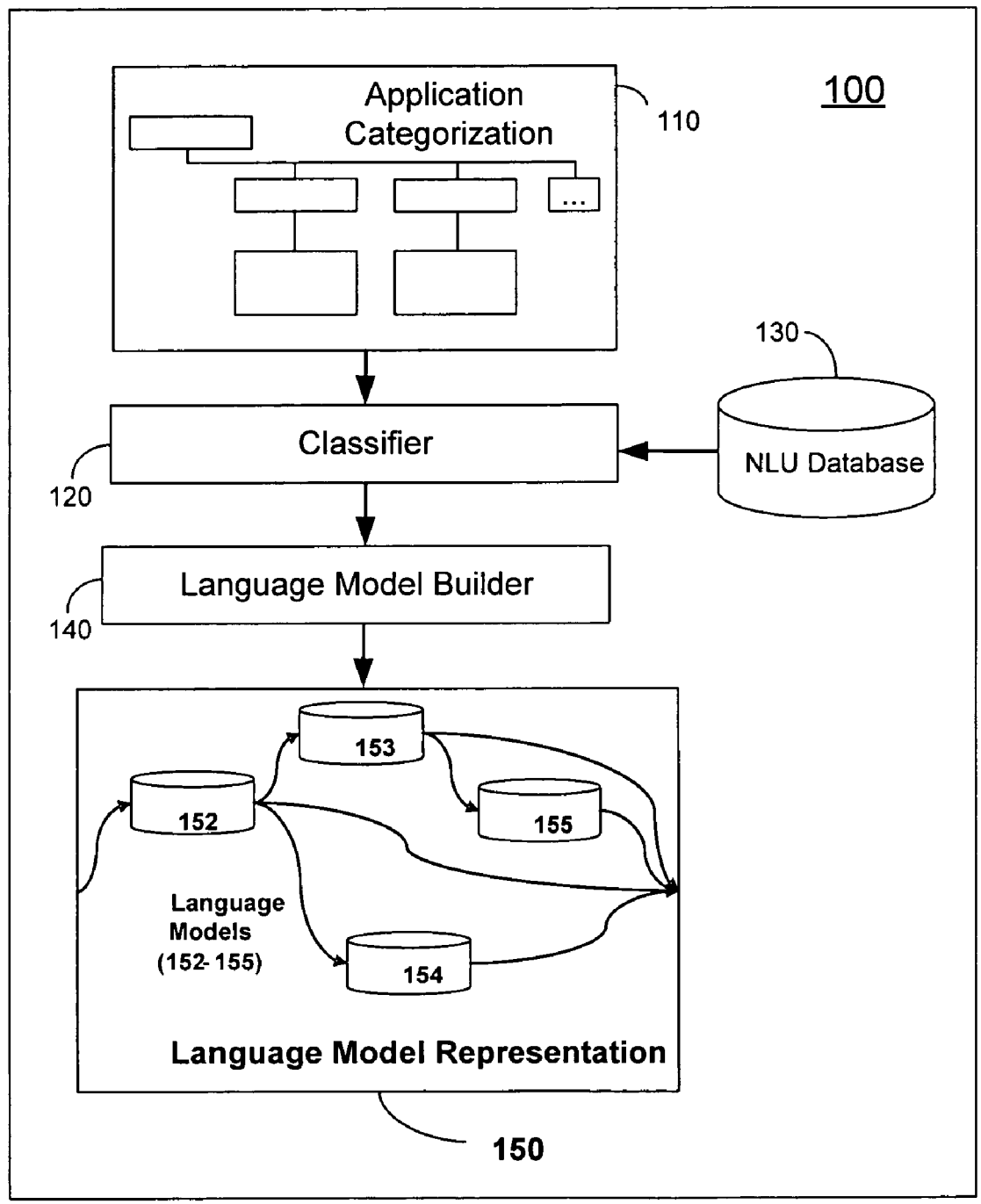
FIG. 1 is a schematic diagram of a natural language understanding system in accordance with one embodiment of the invention.

The invention disclosed herein concerns a system and method for building a language model representation of an NLU application. The invention can create a plurality of language models optimally configured for interpreting a language input request. The interpretation can reside at one of several levels in a hierarchy as shown in FIG. 1—the high levels or category levels provide broad interpretation, whereas the low levels or sub-category levels provide deep or narrow or specific interpretation. The lowest level is referred to as the target of the interpretation. This hierarchical representation of categories, sub-categories and end targets could be for one or more separate features, where a feature refers to specific class or type of interpretation. For example in the request, "I would like the price for a laser printer" features could be the type of request (price request) and the object of the request (laser printer). The language model representation consists of multiple language models trained and configured to identify one or more end targets, sub-categories or categories for one or more features, from the language input request.

In practice, a user can present a language input request to the NLU application for performing an action. The request can be a spoken utterance which can contain specific information that the NLU application is capable of interpreting. For example, within the context of a routing service, the NLU application interprets the user request for directing the user to a correct destination or result, i.e. the target. The user request can contain at least one identifiable feature associating at least a portion of the user request with at least one target of an application categorization. A language model representation of the application categorization can provide a description for how the language models are configured together to interpret a user's request based on a hierarchical relationship of the categories, sub-categories and targets across one or more features within the application categorization. The language model representation provides the configuration—that is, the linkage and flow to be followed between the language models when responding to a user's request. The output of language models would determine whether to direct a user's request to lower language models within the language model representation or not for accurately interpreting a language input request.

A language model associates a user request with at least one of a set of interpretations for which it was trained. For example, a high level language model can initially provide a broad interpretation of a user's request, which the language model representation can examine and further delegate to a lower level model for specifically interpreting the user request. A user request is first submitted to a high language model for which the high language model can produce a response. If the response is an end target, the high language model has sufficiently responded to the user request and no lower language models are employed to interpret the user request. If the response of the high level language model is a category having its own set of end targets or sub-categories, a lower level language model is accessed for further interpretation of the user request. This inquiry process can proceed downwards through the hierarchy of the language model representation. Notably, high level language models are first employed to respond to a user request, and if the response includes a category of further targets or sub-categories, lower level language models are employed to narrow the interpretation of the user request. This process is continued until an end target is reached or any of the language models in the chain is unable to interpret the input request with sufficient confidence.

Figure 5:
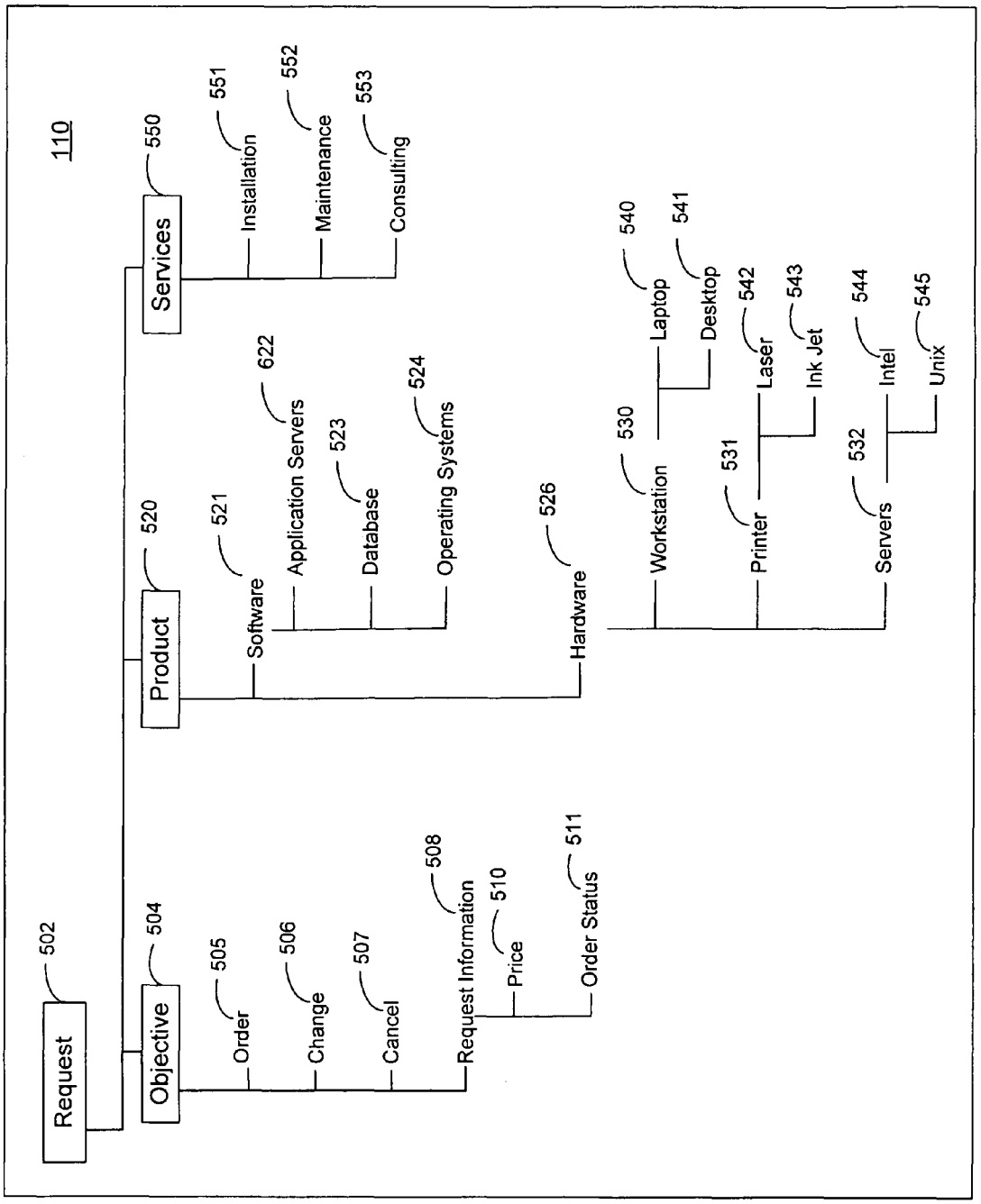
FIG. 5 is an example of a multiple feature, hierarchical representation in accordance with one embodiment of the invention.

Additionally, the language model representation can consist of multiple sets of hierarchically sequenced language models—for different features to be interpreted as shown in FIG. 5. In the case the interpretation process (as described above) proceeding down the hierarchy of categories, sub-categories and end targets would be separately or uniquely carried out for each of the hierarchically sequenced language models. The end result or final interpretation would be the consolidation of the interpretation across all the features in the language model representation.

In one NLU application example, the method of the invention can be utilized within a call routing application for transferring calls to an appropriate customer representative based on a user request. The NLU application can contain language specific models for interpreting the request and identifying features within the request for properly routing the user, or caller, to the appropriate destination. The language specific models are based on the interconnection of the features, categories, and targets within the language model representation. In the call routing example, the target can be considered the resulting action of the user request, or, an end result of connecting a user to a service or destination. In the case of a call routing example, the correct destination or result can be a routing destination. Embodiments of the invention are not restricted to a call routing example, which is presented only as example.

FIG. 1 depicts a system 100 for developing a natural language understanding application. The system 100 can include an application categorization 110, a classifier 120, a language model builder 140 a language model representation 150 composed of language models 152-155 and the configuration between them. The language models and language model representation are the output of the language model builder 140. The language model builder 140 also generates the configuration of the language modes within the language model representation 150. The language model builder 130 can test sentences through the configuration of language models in the language model representation 150 to evaluate or score the test sentence performance. The language model representation 150 can run input language requests through the configuration of language models to obtain an interpretation or classification result. The application categorization 110 can structure a hierarchical relationship between categories, sub-categories and targets across one or more features within an NLU application. In one arrangement, a developer can represent the application categorization 110 through a text editing application. For example, the developer can produce an outline of topics in a text document to categorize the relationship between those topics in the NLU application. The topics and sub-topics can be represented in the application categorization 110 based on the outline of the text document. In another arrangement, the developer can visually categorize topics of the NLU application using a graphical user interface (GUI). For example, the application categorization 110 can interface to a visual toolkit that allows a developer to enter topics of the NLU application. A developer can produce a visual hierarchy by visually categorizing topics of the NLU application using the visual toolkit. The topics can include categories, sub-categories and targets across one or more features which are visually represented and appropriately connected together by the developer. Upon the developer completing the categorization of the NLU application, the developer can classify training sentences based on the categorization represented in 110 from an NLU database 130 or from another external source using the classifier 120. The classifier 120 represents a sentence classification tool that would be used by a developer to classify sentences based on the application categorization 110. Classifier 120 can have a text interface or a Graphical User Interface (GUI).

Figure 2:
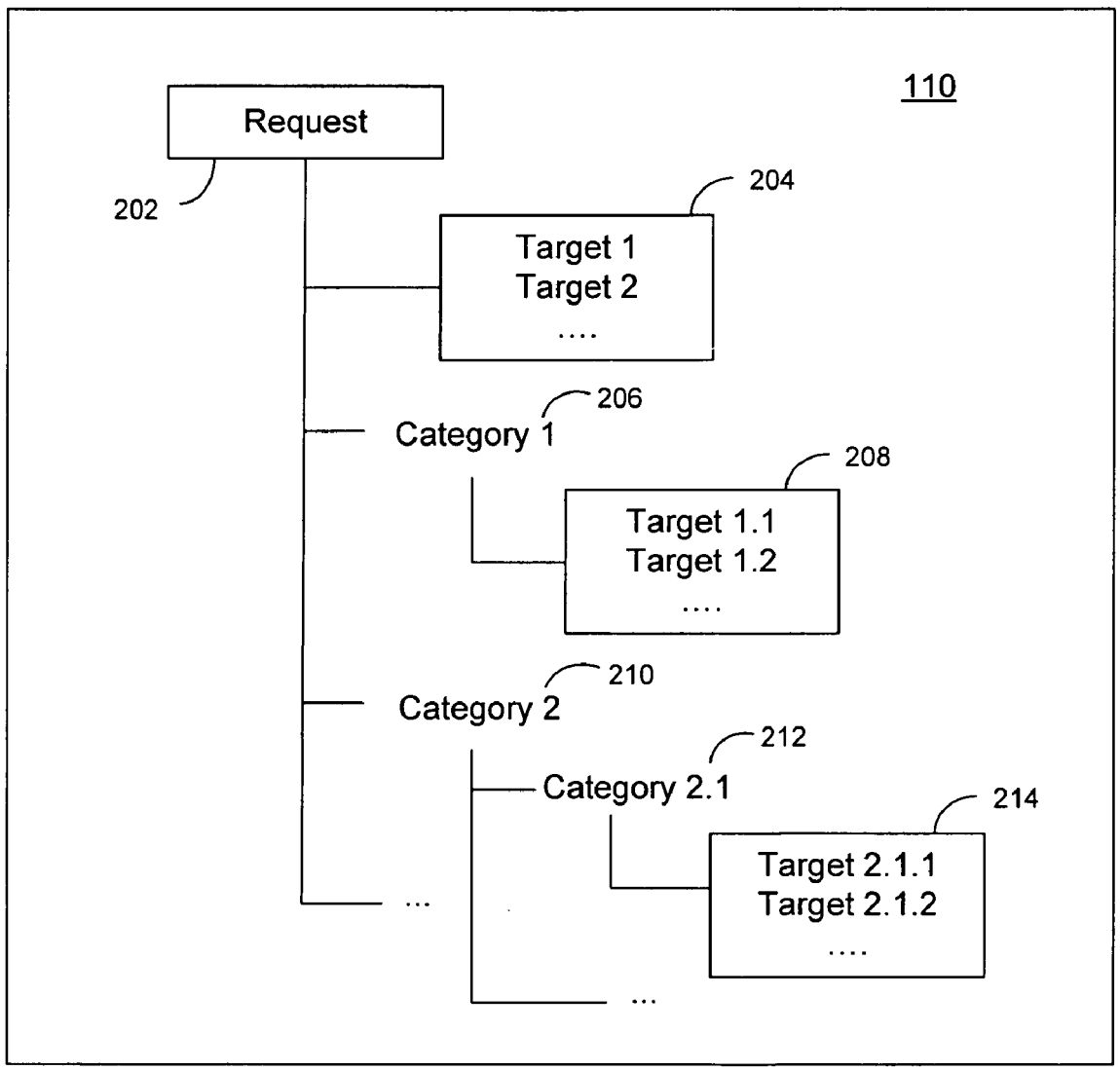
FIG. 2 is a sequential representation for categorizing a domain in accordance with one embodiment of the invention.

For example, FIG. 2 presents a hierarchical/sequential representation of the application categorization 110 that the developer may employ to categorize an NLU application. The targets can be represented sequentially, first by classifying them into broad categories and then classifying each category into sub-categories and then classifying each sub-category into more sub-categories and eventually end targets. In this case, the targets have a parent child relationship. FIG. 2 illustrates a graphical user interface that allows a developer to classify sentences used to train language models for the NLU application based on this categorization. The links can connect the targets within categories to reveal how low level targets are related to one other and their relation to higher level categories. For example, briefly referring to FIGS. 1 and 2, the developer can enter sentences from the NLU database 130 into the application categorization 110 by dragging and dropping sentences into the appropriate node in the visual representation—category (e.g. 210), sub-category (e.g. 212) or end target (e.g. Target 2 in 214)—based on the meaning of the sentence. Upon the developer entering in sentences into the visual nodes 202-214 of the application categorization 110, the classifier 120 creates the associations between the sentences and the category, sub-category or end target in 110 to which it was assigned. In particular, a sentence associated to a low level node such automatically gets assigned to all its parent nodes in the hierarchy. For example when a sentence is assigned to end target Target 2 in 214, it automatically gets assigned to sub-category 212 and category 210. These associations between sentences and nodes in the application categorization 110 form the training data for the language model builder 140. The language model builder 140 can produce at least one language model representing at least one node within the hierarchy. The language model builder also includes the processing required to determine the optimal configuration between the language models. The output of the language model builder is the language model representation 150 which consists of one or more language models and the relationship amongst one another within the application categorization 110. This relationship between the language models in the language model representation 150 is referred to as the language model configuration.

Referring back to FIG. 1, a high level language model can be connected to lower level language models. The higher and lower level language models can be interconnected to provide the configuration for interpreting a user request and directing a user request to a target within the language model representation 150. The language model builder 140 can generate an optimal set of language models 150 based on the classification of the sentences entered by the developer (i.e. training data). Notably, the classification of the training data associates sentences to a category, sub-category or end target based on the meaning of sentences for providing a correct interpretation when a user submits a language input request. The language model builder 140 learns these associations by building language models to capture the semantic content of the classified training data. Language models can be created within the application categorization in accordance with the hierarchical relationship for correctly interpreting a user's request.

For example, FIG. 2 can illustrate a financial NLU application. The financial application can have categories such as 'banking' 206 under category 1, 'lending' 210 under category 2, and 'mortgages 212, under sub-category category 2.1. Targets in the sequential representation can be listed under the categories, sub-categories or directly under the request 202. For example, targets 204 can be under request 202. They can also fall under categories 206 and sub-category 214. The same targets could be present under multiple categories or sub-categories. But targets may be unique to a category or sub-category or unique to a collection of categories or sub-categories.

Figure 3:
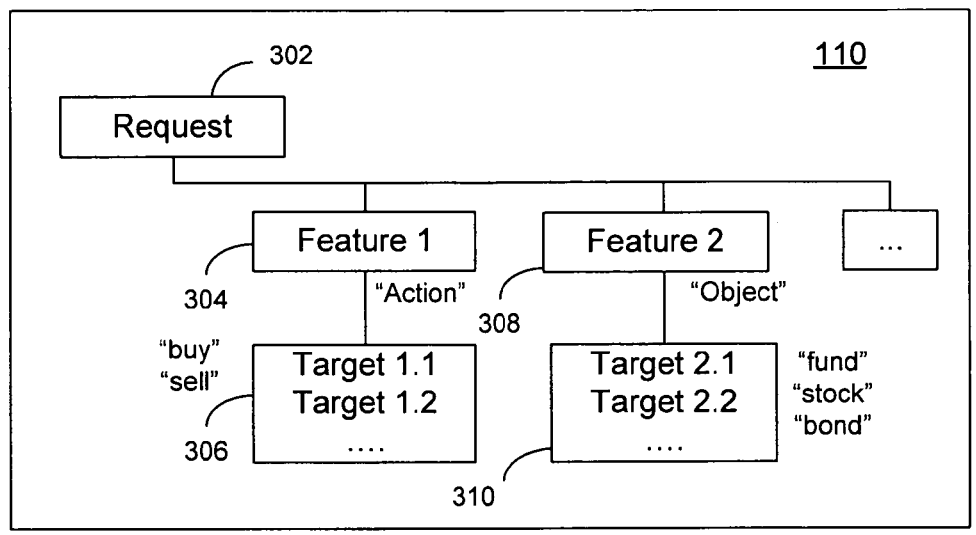
FIG. 3 is a multiple feature representation for categorizing a domain in accordance with one embodiment of the invention.

FIG. 3 presents another type of visual representation that the developer may employ to categorize an NLU application domain and which constitutes another embodiment of the application categorization 110. Referring to FIG. 3, a multiple feature categorization is shown. For example, a single natural language (NL) request could yield multiple pieces of information or map to multiple separate or independent or un-related targets. In the visual representation of FIG. 3, Features 1 . . . N represent independent features or parameters that can be identified from the request, and each feature in turn can take one of many possible target values. For example in a financial application, action and object could be two features, where possible actions could be buy, sell, balance and possible objects might be funds, stocks, bonds, etc.

A developer of the financial application may anticipate user requests, such as, for buying or selling stocks. During development, the developer may identify at least one feature in the NLU application domain. The developer can enter these features within the visual representation of the application categorization 110. For example, 'action' 304 and 'object' 308 could be two features within the aforementioned NLU application domain, where possible 'actions' could be 'buy' 306 or 'sell' 306, and possible objects might be 'bonds' 310 or 'stocks' 310. The developer can enter the 'action' and 'object' features within the application categorization representation. For example, referring to FIG. 3, the feature 304 can be 'action' and the feature 308 can be 'object'. The targets 306 under feature 304 can be 'buy' and 'sell', and the targets 310 under feature 308 can be 'bond' and 'stock'.

Figure 4:
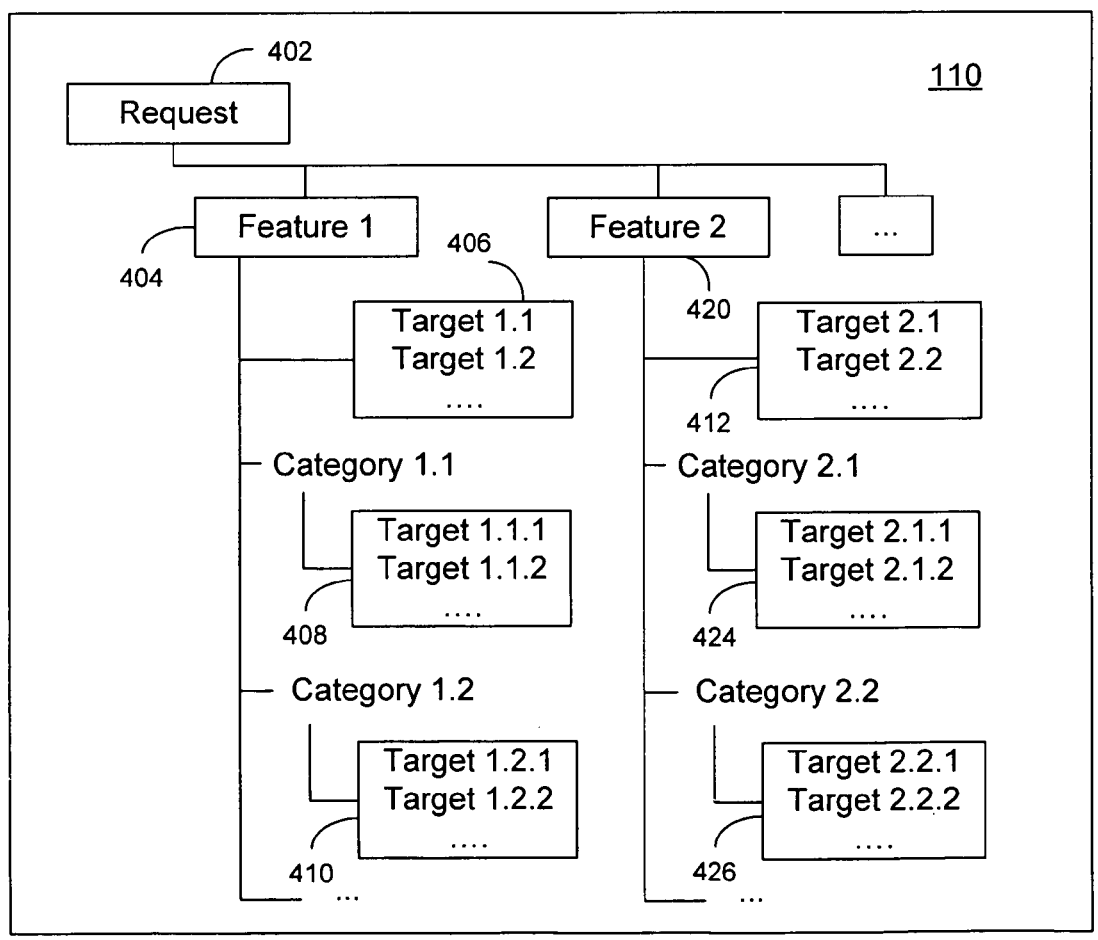
FIG. 4 is a multiple feature, hierarchical target representation for categorizing a domain in accordance with one embodiment of the invention.

FIG. 4 presents another type of visual representations that the developer may employ to categorize the NLU application domain and which constitutes another embodiment of the application categorization 110. Referring to FIG. 4, a multiple feature hierarchical target categorization is shown which corresponds to the general situation when there are multiple features, and hierarchical categorization within each feature of the application domain. The visual representation of the application categorization 110 identifies the categories, sub-categories, and end-targets for the application domain and how they relate to each other to generate a visual representation similar to the ones shown above. In this arrangement, the application categorization can be represented as a parallel set of features, each feature consisting of categories, sub-categories and end targets. For example, referring back to the financial example, the feature 404 can be 'action' and the feature 420 can be 'object'. Categories, sub-categories and end targets 406-410 can be included under the main feature 404. Accordingly, each category or sub-category can have a list of targets. For example, 410 under 'Category 1.2' can consist of a set of targets: Target 1.2.1 and Target 1.2.2. Notably, the targets can also be listed under multiple categories or sub-categories or features. But targets may be unique to a category or sub-category or feature.

FIG. 5 shows an example application categorization for a products and services ordering application using the representation of FIG. 4 is shown. In this example the features are 'Objective' 504, 'Product' 520, and 'Services' 550. Under each feature there are categories, sub categories and targets. For example, under 'Objective' 504 the categories are 'order' 505, 'change' 506, 'cancel' 501, and 'request information' 508. Further under 'request information' 508, are targets: 'price' 510, and 'order status' 511. Accordingly, there are categories, sub-categories and targets under 'Product' 520 and "Services' 550. For example, for feature 'Product' 520 there is category 'Hardware' 526 under which are sub-categories 'Workstation' 530, 'Printer' 531 and 'Servers' 532, each of which has several end targets (540-545). Depending on the information contained in the input language request, the language model representation 150 and its language models may unambiguously associate the request to an end target or may only be able to associate it to a category or sub-category or it may find the request to be ambiguous between two or more categories, sub-categories or end targets. For example, 'I want to order an inkjet printer' can unambiguously be associated to end target 'inkjet' (543) through the chain of categories and sub-categories—Product (520), Hardware (526), Printer (531) and to Inkjet (543). Instead, if the request were, 'I want to order a printer', that would be associated with 'Printer' (531).

Figure 6:
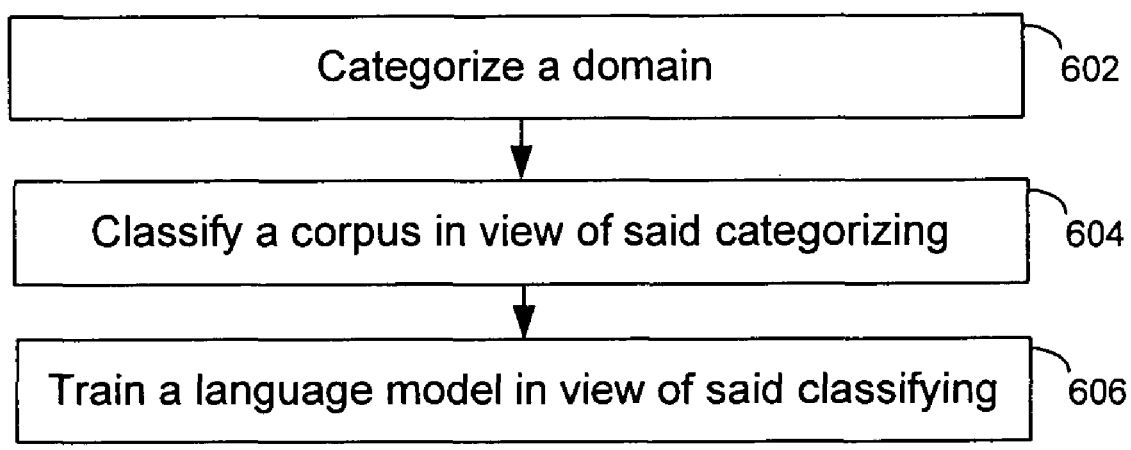
FIG. 6 is a method for building a natural language understanding application in accordance with one embodiment of the invention.

FIG. 6 presents a method 600 for building language models. When describing method 600 reference will be made to FIGS. 1-5. The method 600 is not limited to the method steps shown in FIG. 6, and can include more or fewer steps than those listed. At step 602, a developer can categorize a domain. For example, using the financial NLU application of FIG. 5, the NLU application can be categorized according to the multiple feature hierarchical target categorization of FIG. 4. Notably, the developer programmatically or manually categorizes topics of the NLU application to create the application categorization 110. The developer creates the application categorization 110 by extracting topics of the NLU application and organizing them into features, categories, sub-categories, and targets as discussed in the context of FIGS. 2-4. The developer considers words, sentences, and phrases and the manner in which they will be interpreted when creating the application categorization 110. At step 604, the developer can classify a corpus in view of the categorizing. Upon categorizing the NLU application domain into a application categorization 110, the developer can extract sentence examples from the NLU database 130 or another source and enter the sentence examples into the application categorization 110. The developer can drag and drop a sentence example under one of the features, categories, sub-categories, or targets of the application categorization 110. For example, referring to FIG. 5, the sentence "I want to request price information for a printer" can be directed to the 'Objective' feature 504, having targets: 'Request Information' category 508, and 'price' target 510. The sentence can also be directed to the 'Product' feature 520 having targets: 'Hardware' category 526 and 'Printer' sub-category 531. The developer can classify all of the corpus sentences in the NLU database by associating each sentence with the "targets" that represent a correct interpretation of the sentence. The developer can enter the sentence into each mentioned link or only within one mentioned link. Associating a sentence to a low level node would cause the sentence to be automatically assigned to all parent nodes in the hierarchy. The application categorization 110 can determine the appropriate categories and targets to associate with the training sentence.

For example, referring back to FIG. 1, the classifier 120 learns an association between the sentence and the elected target or set of targets when the developer makes the physical connection between the sentence and the target. Notably, the developer enters the training data into categories for capturing the intent and meaning of the sentence under the category. The system 100 associates the sentence with the selected category and other related categories under the main feature by forming associations for all lower categories within the main feature and across other features. The system 100 also associates the sentence across main features. For example, the sentence "I want to request price information for a printer" was applied to targets within the 'Objective' feature 504 and the 'Product' feature 520.

Referring back to FIG. 6, at step 606, at least one language model can be trained in view of the classifying. A language model can be generated for associating a set of example sentences with categories, sub-categories or targets under a feature. The language model can provide a broad or narrow interpretation for responding to a user request. Referring to FIG. 1, the language model builder 140 builds language models 152-155 and the language model representation 150 based on the associations formed during the classification step within the application categorization. The language model representations of the language models 152-155 are not limited to the arrangements shown. In fact, the language models can take on various configurations and interconnections during the training, as one skilled in the art can appreciate. The associations formed are correspondingly related to the categories ordered in the hierarchical structure. The language model builder 140 can partition the training data set entered by the developer into multiple data sets to build multiple models. Multiple models serve to distribute the interpretation task across several models to obtain the appropriate association of input requests to categories, sub-categories or end targets across one or more features. The training is an iterative process that builds statistical interpretation models using the classified data and tests it using a test set. If the accuracy of using the language models is not good enough, then the language model builder 140 divides training examples at branches, and builds new models based on the partitioning. The language model builder 140 produces a configuration file which describes the sequencing and flow of input request processing between the various language models during run time execution. The language model builder 140 tests the new configuration by passing the example sentences through the models in the sequence defined by the configuration file.

Figure 7:
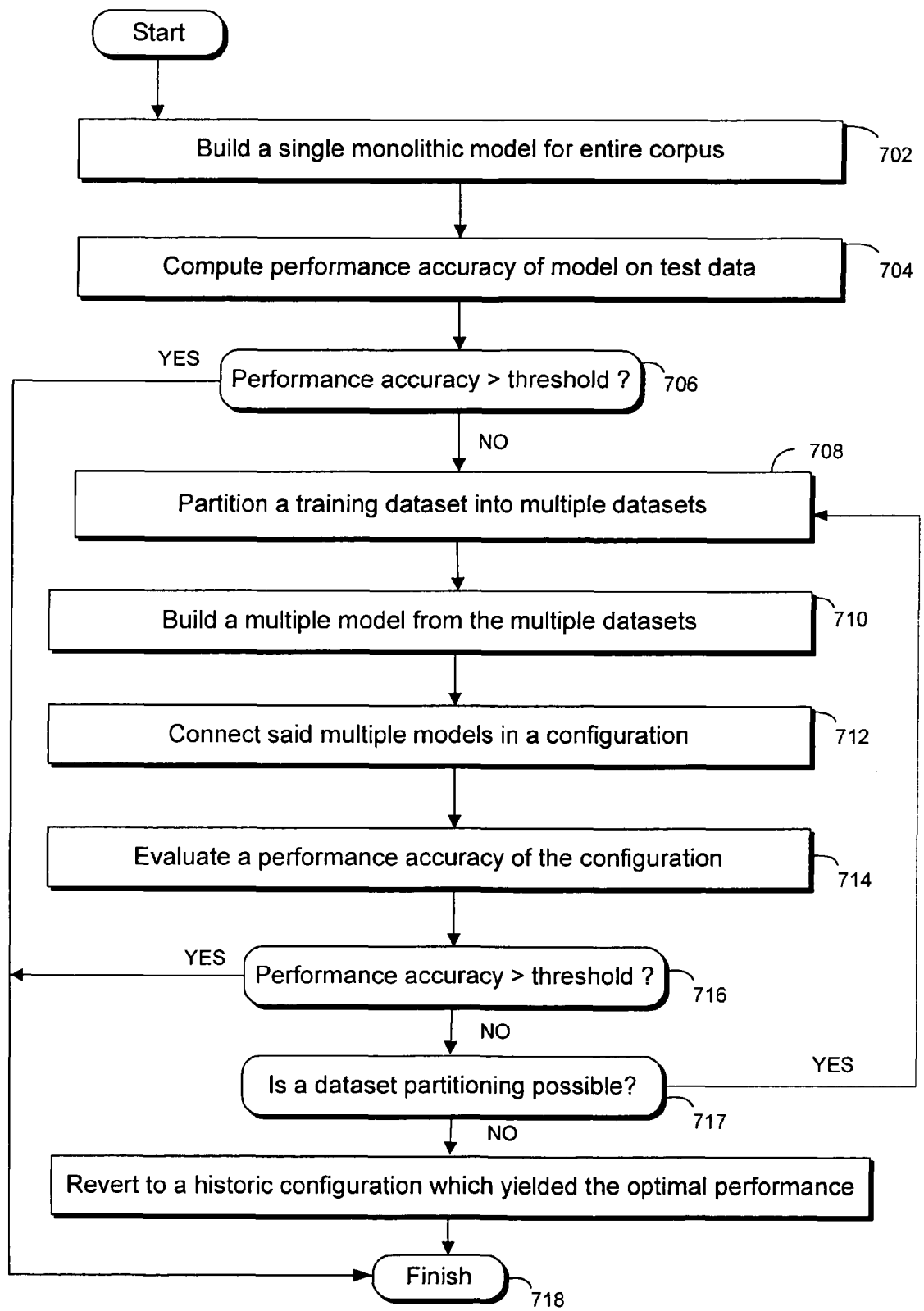
FIG. 7 is a flowchart presenting a detailed method from FIG. 6 for building a natural language understanding application in accordance with one embodiment of the invention.

Referring to FIG. 7, a more detailed approach to the method 600 is provided for training a natural language model. The method 700 can contain fewer or more than the number of method steps shown in FIG. 7. The method 700 presents a flow chart method for building an application domain specific natural language model. Reference will be made to FIGS. 1, 2, 8, 9, and 10 for describing and illustrating the method. The method 700 can commence when the step of classifying the training data is complete, which corresponds to method step 604 of FIG. 6.

Figure 8:
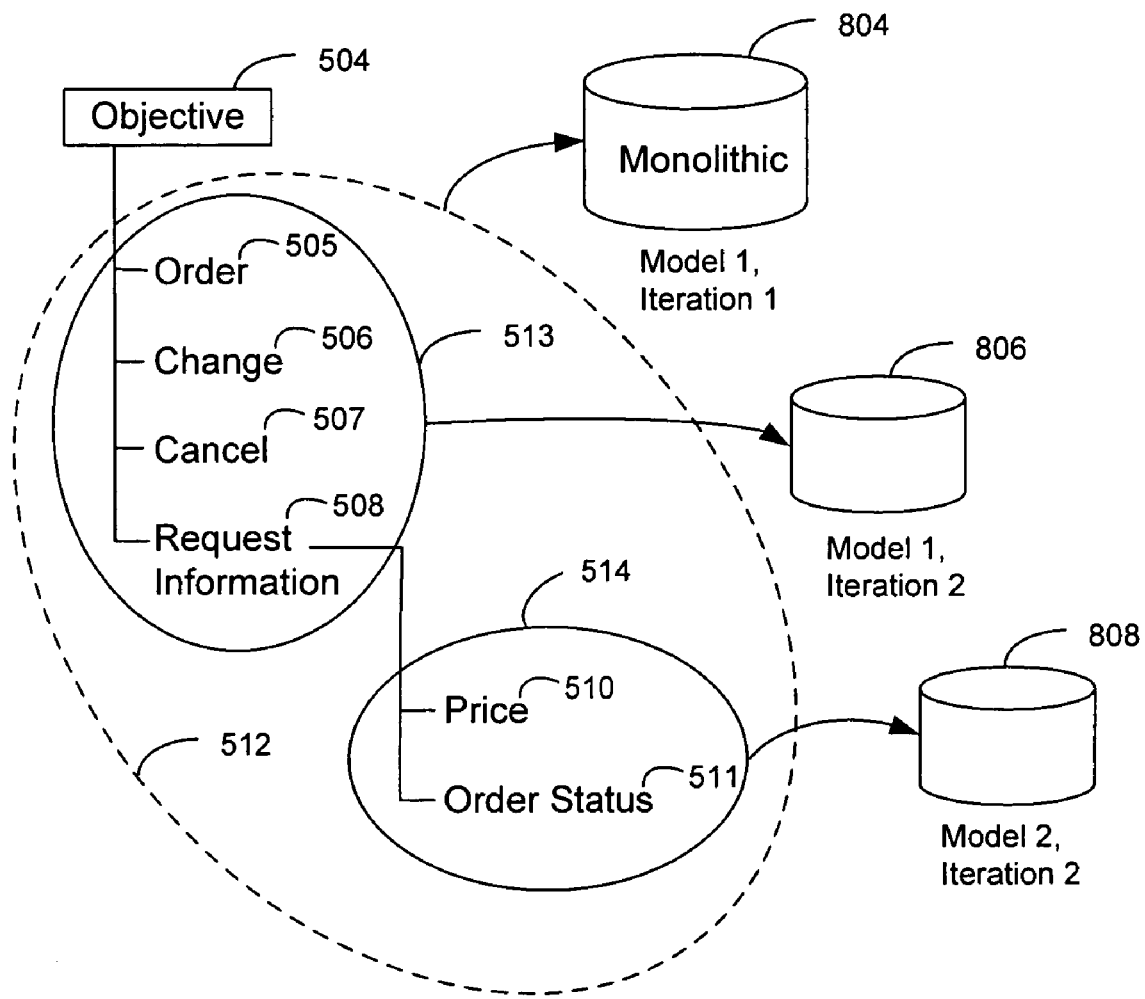
FIG. 8 is an illustration of a model building example for one feature of the multiple feature hierarchical representation of FIG. 5 in accordance with one embodiment of the invention.

At step 702, a single monolithic model can be built using the classified training data in accordance to the application categorization. For example referring to FIG. 1, the NLU domain has been categorized by the developer into an application categorization 110, the developer entered training data from the NLU database 130 into the application categorization 110 at specific locations, and the classifier 120 has formed associations within the application categorization given the classification of the training data. The language model builder 140 then builds a single natural language model to learn the association between training sentences and the end targets to which they were assigned during the classification process. In other words the single monolithic model tries to learn the entire application domain. Reference will be made to FIG. 8 for illustrating an exemplary process by which a plurality of language models are built from the application categorization.

For example, referring to FIG. 8, the main feature 'Objective' 504 from the products and services ordering application of FIG. 5 is illustrated. The main feature 504 contains 6 possible targets 505, 506, 507, 508, 510 and 511. 508 is a category that has the end targets 510 and 511. These were previously discussed and identified in FIG. 5. The 'Objective' 504 is one particular feature of the NLU application. First, the language model builder 140 builds a single monolithic language model 804 for the end targets under feature 504. For example, the visual representation of FIG. 8 has 6 targets: one for each of the nodes in the tree of the application categorization (order 505, change 506, cancel 507, price 510, order status 511), plus one for the category (request information 508). Notably, the category 508 is also included as one of the targets. For example, the developer may have a sentence such as "I am calling to get some information", which the developer classifies by dragging the sentence to the "request information" category 508 in the visual representation. As another example, the developer classifies the example sentence "I'm calling to get some information on prices" as a "price" target 510 which is automatically associated with "request information" category 508.

When the developer classifies the corpus of sentences into the visual representation, if the sentence is classified in one of the nodes (price 510, order status 511), the classifier 120 automatically assigns the sentence to all the categories and sub-categories above (order 505, change 506, cancel 507, request information 508) within the visual application categorization 110. For example, if the developer enters the example sentence "I want some information on prices" under a "price" request 510, the sentence is additionally associated with a "Request information" 508 request when building model 806, and the sentence is associated with a "Price" 510 information when building model 808 in the second step of the iterative process.

Recall, the first step in the build process is the building of the monolithic statistical model 804, which produces one model. Following this, the language model builder 140 passes test sentences through the monolith model 804 to produce an interpretation result indicating that the meaning of the sentence is one of the 6 targets (order 505, change 506, cancel 507, request information 508, price 510, and order status 511). If the accuracy of the model is not acceptable, an iterative process is started wherein multiple models are built from the classified corpus data by dividing the tree at its branches. For example, the branch of FIG. 8 corresponds to the 'Request Information' 508 category. In this example, the next step will be to build 2 models. The first language model 806 containing data corresponding to the group of 4 targets 513, representing the first level of the hierarchy (order 505, change 506, cancel 507, request information 508, price 510, order status 511). The second language model 808 represents the leaves in the "request information" 508 branch (price 510, order status 511), and will contain a group of 2 targets 514. The language model builder 140 creates the first and second language models.

At step 704, the language model builder can determine if a performance accuracy of the monolithic model exceeds a threshold. For example, the developer can present a test suite of examples to the monolithic model to compute the base-line performance accuracy of the model on this test data. The test cases may have a number of sentences with specific targets already mapped out, and may have test sentences under a similar hierarchical structure as the application categorization 110 of FIG. 1. Referring to FIG. 1, the language model builder 140 evaluates the test cases to determine how well the monolithic model 804 can identify the correct targets for the test sentences by expressing a performance accuracy. If the performance accuracy exceeds a threshold the model performs acceptably and does not require a partitioning. However, if the single monolithic model does not perform acceptably, the language model builder 140 partitions the data into respective categories based on the application categorization 110.110. The language model builder 140 starts at the highest level and builds downwards into the hierarchy building the language model representation 150. During training, the language model builder 140 evaluates test language requests to the new configuration of language models for yielding a classification result. The language model representation 150 also generates intermediate classification results with confidence scores for each language model. During runtime, the targets with the highest classification result will be selected to provide information in response to the language input request. In certain cases, the language model representation 150 can return a null message if the performance accuracy of a language model is below a threshold level.

At 706, if the first iteration does not produce an acceptable performance, the language model builder 140 produces a first partitioning of the dataset thereby producing two NLU models 806 and 808 at the second iteration as a language model representation 150. In this case the 2 models will be used in sequence when appropriated to obtain the complete interpretation. For example, in response to language input when the output of model 806 is one of 505-507, no further processing is necessary, whereas when it is 508, the language input is further sent through model 808 to determine if the end target is 510 or 511.

The language model builder 140 evaluates the performance for models 806 and 808 in the language model representation 150 on the test data and compares it with the threshold for determining if the accuracy is acceptable or if another partitioning is necessary. At step 716, the building process is complete if the language model representation 150 provide acceptable performance. If the language model representation 150 does not provide acceptable performance, it has not adequately captured the information content from the training sentences classified to adequately interpret the sentences in the application categorization 110. At step 717, the language model builder 130 determines if another partitioning of the data set is possible. For example, referring to FIG. 2 a partitioning is possible if language models can be built for categories or subcategories further down in the visual hierarchy. For example, referring to FIG. 8, the end targets 510 and 511 belong to sub-category 514 which corresponds to language model 808. A final partitioning up to sub-category 514 is possible. In general, a partitioning is possible to the point at which a language model has been built down to the lowest set of end targets under a category or sub-category within the visual hierarchy of the application categorization. If a further partitioning is possible, the method returns to step 708 for further partitioning the data corpus. If a further partitioning is not possible, then of the previous partitions, the model configuration that yielded the best performance accuracy on the test data is used for the optimum model configuration. Accordingly, at step 708 the language model builder 140 partitions the training data within the application categorization 110 based on the categorization structure if further partitioning is possible. If no further partitioning is possible, then of the previous partitions, the language model representation 150 that yielded the best performance accuracy on the test data is considered as the optimum model configuration to be used at runtime.

The language model builder 140 also automatically determines this sequencing between models referred to as the language model configuration that describes how to pass an utterance through the models at runtime to achieve the highest accuracy. This configuration can be represented in a configuration file or similar entity and is a part of the final language model representation 150. The configuration file specifies that an utterance should be first passed through model 806, then optionally through model 808 to obtain the final interpretation. For example, if the interpretation from model 806 is one of the leaves of the tree (order 505, change 506, cancel 507), then the interpretation is complete. A response under one of the targets is provided. If the interpretation from model 806 is the "request information" 508 branch, the configuration file causes the utterance to also be passed through model 808 to obtain the final interpretation. The final interpretation is still one of the 6 targets, but the target is reached by going through 2 models.

This process of creating new models by partitioning the data and automatically generating the configuration file continues until the accuracy is acceptable.

For example, at step 708 the training data set can be partitioned into multiple datasets. Referring to FIG. 8, the original data 512 set can be partitioned during a second iteration into two data subsets 513 and 514 each corresponding models 806 and 808, respectively. Notably, an iteration partitions a first model into two new models. The objective of the partitioning is to emphasize the context sensitivity within the newly isolated category; that is, the newly partitioned data subset. Each time the step of partitioning is completed at 708, the language model builder 140 evaluates the new configuration. At step 712, the multiple models can be connected in a configuration. For example, referring to FIG. 1, the language model builder 140 can connect the models in a configuration. For example, referring to FIG. 8, a first model, 804 and second models, 806 and 808 are shown. Each configuration delves further into the hierarchy producing more context specific language models where the number of models depends on the number of categories and sub-categories. The configuration of the models expands from a broad generalization (high-model level) to a narrow generalization (low model level) and provides the broad to narrow search interpretation of the language input requests.

At step 714, a performance accuracy of the configurations is evaluated. Referring to FIG. 1, the language model builder 140 compares each model to a base-line performance and a previous performance. Each new iteration produces a new configuration with a new set of language models that are compared against the previously existing models. The models are evaluated collectively at each new iteration to ensure the models together yield better performance accuracy than the threshold and better than that obtained from the previous sets of model configurations. The model configuration that yielded the best performance accuracy on the test data is considered as the optimum model configuration to be used at runtime. For example, referring to FIGS. 1 and 9, at iteration 1, the language model builder 140 evaluates the performance accuracy of the monolithic model 920, at step 716, and a new partitioning is created if the performance accuracy is below the threshold. For example, at iteration 1, the data associated with language model 920 is partitioned according to category/sub-category/target groups or 902, 904, and 905 to yield language models 930, 932 and 934 respectively. If the performance is not adequate, the language model builder 140 commissions a new partitioning. The language model builder 140 continues to progress through the application categorization 110 generating new models in the language model representation 150 when the collective performance accuracy of the models is not acceptable.

Notably, steps 708 through 716 constitute an iterative process for building an optimal set of models in view of the hierarchical arrangement of the categories. The process continues until all categories have been partitioned. Based on this process, for example, with reference to FIG. 8, 2 models are produced as a result of the partitioning: model 806 and model 808. The performance accuracy is acceptable and the partitioning of the dataset has ceased. At this point, an optimal number of models in an optimal configuration has been achieved.

Figure 9:
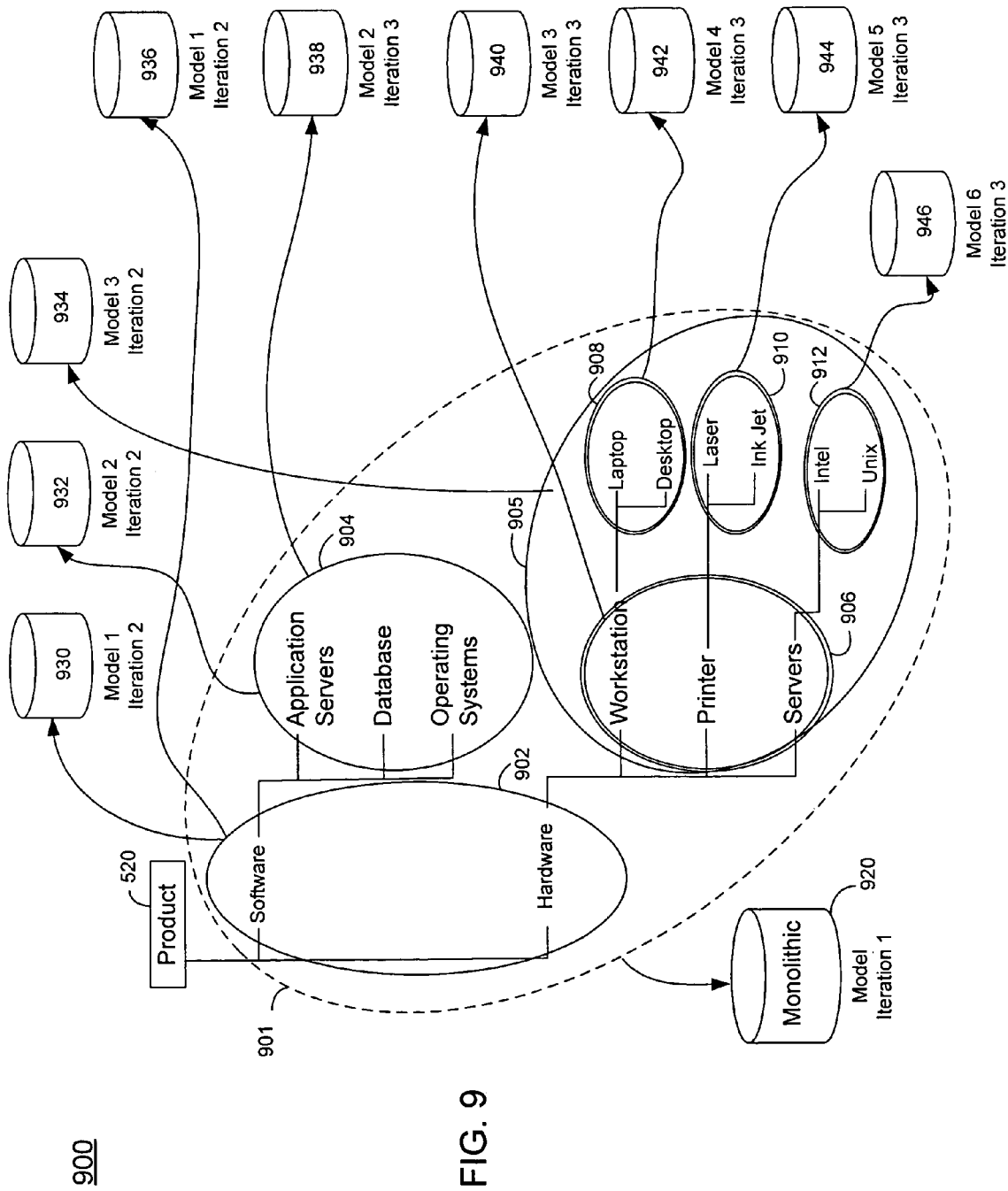
FIG. 9 is an illustration for the iterative partitioning and model building for multiple sets of hierarchical models in accordance with one embodiment of the invention.

Referring to FIG. 9, as an example, an illustration for the iterative partitioning of multiple sets of hierarchical models is shown. The illustration shows the partitioning manner in which language models are created, staring with a single monolithic language model. The illustration of FIG. 9 presents the hierarchical representation of language models for the main feature 'Product' 520 of FIG. 5. The 'Product' 520 includes broad categories 902, sub categories 904 and 905. Sub-category 905 includes a sub-category 906 which has end targets 908, 910, and 912. Notably, the categories and sub-categories can also be referred to as partitions. 901 represents all of the categories, sub-categories and end targets and is associated with a language model 920 that corresponds to the main feature category 'Product' 520. On a first iteration, a performance accuracy is evaluated with respect to the baseline model. For example, referring to FIG. 1, the language model builder 140 submits test sentences through the monolithic model to determine if the monolithic model can accurately interpret all of the listed targets. If the monolithic model 920 does not provide acceptable accuracy, the classified corpus in the application categorization 110 is partitioned to lower targets. For example, a second iteration yields a partitioning of 901 to produce three partitions 902, 904, and 905 that map to a first model 930, a second model 932, and a third model 934. After the second iteration (i.e. first partition) the language model builder 140 passes test sentences through the new configuration created by the second iteration. If all targets are adequately interpreted then no further partitions are necessary, else a second partitioning is commissioned. For example, data associated with language model 905 is further partitioned into partitions 906, 908, 910, and 912 on a third iteration to achieve a higher interpretation performance accuracy. Each partition produces a language model. For example, partition 906 produces language model 940, partition 908 produces language model 942, and so on. Notably, the end targets for partition 906 each of the categories 908, 910, and 912 do not require further partitions. Understandably, language model 942 adequately interprets differences between language inputs on the subject of laptop and desktop. As another example, language model 944 adequately interprets differences between language inputs on the subject of laser and Inkjet. As a result of the partitioning, the language models can adequately discriminate language requests for interpreting actions associated with their respective end targets.

Figure 10:
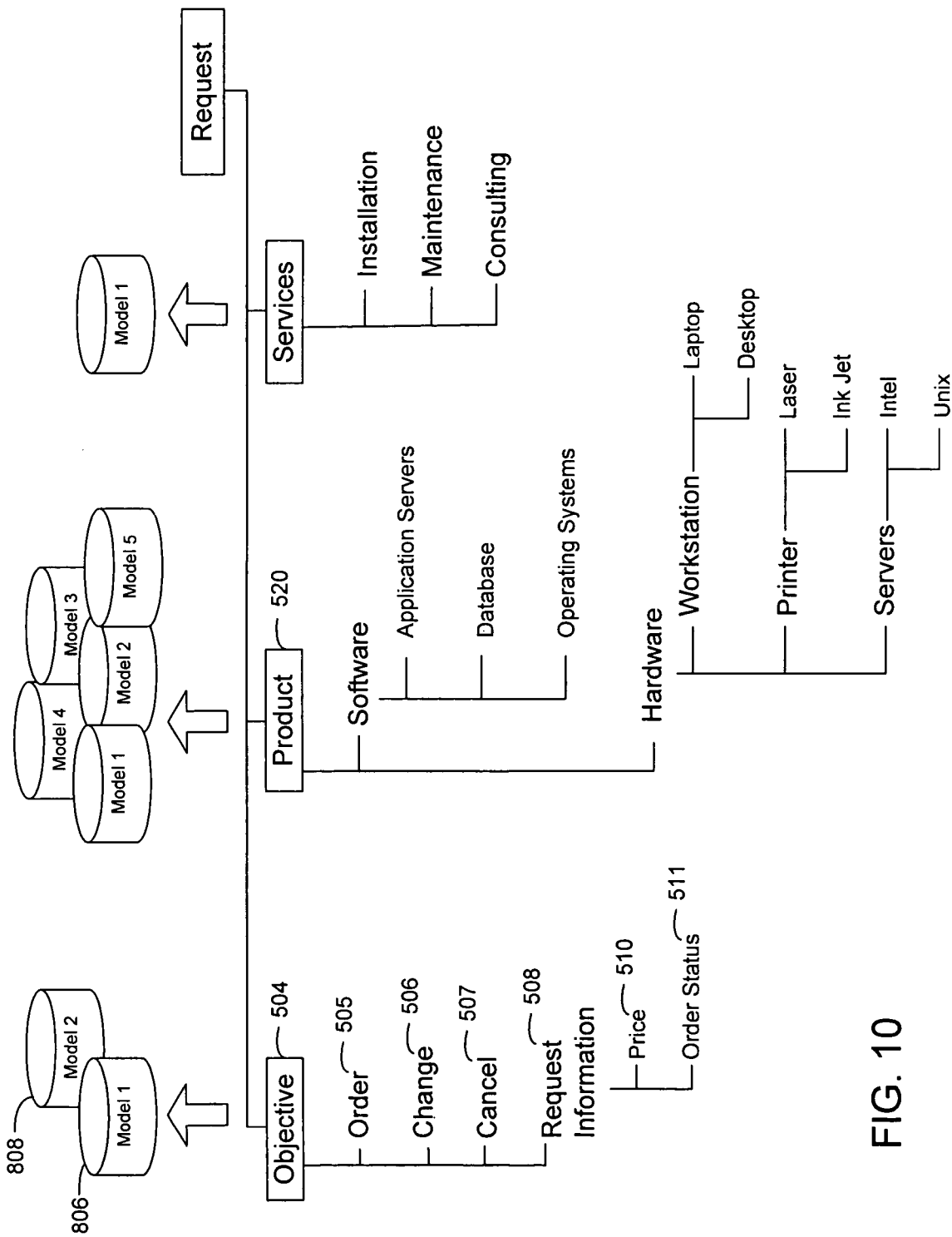
FIG. 10 is an illustration of multiple language models for an application categorization in accordance with one embodiment of the invention.

FIG. 10 illustrates the resulting language models produced by the method 700 for the NLU purchasing application of FIG. 5. Notably, each feature of the NLU purchasing application produces its own set of language models. The language model builder 140 carries out the iterative language model development process described in 700 for each of the features defined in the application configuration 110. For example, feature 'Objective' 504 produces two language models 806 and 808 which were produced during the second iteration as illustrated in FIG. 8. The first language model 806 corresponds to the first branch under 'Objective' 504 having targets: order 505, change 506, cancel 507. The second language model 808 corresponds to the second branch under 'Request Information' having targets: Price 510, Order Status 511). Referring back to FIG. 10, Feature 'Product' 520 produces up to five language models according to a number of partitions generated by method 700. Accordingly, five branches can be seen in the hierarchical representation of categories under 'Product' 520 of FIG. 10. Lastly, feature 'Services' 550 produces one monolithic language model as can be seen by the single set of targets (Installation, Maintenance, and Consulting). The number of language models shown in FIG. 10 is only an example and in practice they can be more or less. Those skilled in the art can appreciate that the number of language models produced in the optimum language model configuration depends on a number of factors such as the nature of the training and testing data, the language model representation and how the data has been classification. It is highly application dependent.

An alternative criterion to identifying the optimal language model configuration is to iteratively continue the partitioning process until no further partitioning is possible. The performance accuracy of the language model configuration at each iteration is recorded, and the configuration with the highest accuracy is considered as the optimal language model configuration to be used in the final language model representation 150. A combination of this approach along with the use of a performance threshold could also be employed.

The aforementioned components can be realized in a centralized fashion within the computer system 100. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for building a language model configuration comprising the steps of:
   categorizing a natural language understanding (NLU) application to produce an application categorization having a plurality of categories;
   classifying a corpus of example expressions to produce a classified corpus by identifying at least one of the categories for each example expression of the example expressions; and
   operating at least one computer configured with a plurality of instructions that, when executed, cause the at least one computer to train at least one statistical language model using said classified corpus by:
      building from the classified corpus a first language model configuration comprising a first statistical language model;
      evaluating an interpretation accuracy of the first language model configuration using test data;
      determining whether the evaluated interpretation accuracy of the first language model configuration is less than a desired accuracy;
      when it is determined that the evaluated interpretation accuracy of the first language model configuration is at least the desired accuracy, then adopting the first language model configuration; and
      when it is determined that the evaluated interpretation accuracy of the first language model configuration is less than the desired accuracy, then:
         sub-dividing the application categorization into a plurality of sub-categories; and
         building a second language model configuration comprising a plurality of statistical language models corresponding to the plurality of sub-categories.

2. The method of claim 1, wherein categorizing the natural language understanding (NLU) application to produce an application categorization having a plurality of categories comprises representing the application as a hierarchical tree of categories, sub-categories and end targets in the application categorization for one or more features or types of interpretation.

3. The method of claim 2, wherein operating the at least one computer to train the statistical language model comprises causing the statistical language model to learn associations between, categories, sub-categories and end targets across multiple features within said application categorization, such that a language input request is identified, using a statistical language model, with at least one action that corresponds to a target.

4. The method of claim 2, further comprising producing a visual representation of said application categorization for visually categorizing and visually classifying said natural language understanding application.

5. The method of claim 4, wherein visually classifying includes dragging and dropping a sentence of said corpus into at least one target of said visual representation.

6. The method of claim 4, further comprising automatically classifying an example sentence in category targets above a node in the visual representation when a developer classifies said example sentence in said node.

7. The method of claim 1, wherein identifying at least one of the categories for each example expression of the example expressions comprises identifying at least one target in said application categorization to provide a correct interpretation of the example expression.

8. The method of claim 1, wherein:
said classifying further comprises associating an example expression with multiple targets corresponding to one or more features; and
the method further comprises providing to a user of said natural language understanding application who has entered a language input request multiple pieces of information from said language model representation.

9. The method of claim 1, wherein the method further comprises interpreting a language input request at runtime using the at least one statistical language model in a defined sequence that provides the highest trained accuracy of natural language interpretation.

10. The method of claim 1, wherein:
sub-dividing the application categorization into a plurality of sub-categories comprises sub-dividing the application categorization into a plurality of sub-categories at least one branch within said application categorization;
building a second language model configuration comprising a plurality of statistical language models comprises:
building a statistical language model for each of said at least one branch corresponding to the plurality of sub-categories; and
saving a configuration file describing a sequential interconnection of each statistical language model of the plurality of statistical language models; and
the method further comprises evaluating the interpretation accuracy of the second language model configuration by passing sentences of test data through said statistical language models of the second language model configuration in a sequence described by said configuration file.

11. The method of claim 10, further comprising logging a history of a performance accuracy for each new configuration, comparing a historic performance accuracy of a previous configuration to a new performance accuracy of said new configuration, and reverting to said historic configuration if said new performance accuracy is less than said historic performance accuracy,
wherein if no further partitioning is possible, then of the previous partitions, the model configuration that yielded the best performance accuracy on the test data is considered as the optimum model configuration.

12. The method of claim 1, wherein during a runtime, a user request is first submitted to a high language model for which the high language model produces a response, and if the response is an end target then the high language model has sufficiently interpreted the user request and no lower language models are employed to interpret the user request, whereas if the response of the high level language model is a category having its own set of end targets then a lower level language model is further accessed for interpreting the user request.

13. The method of claim 1, wherein the plurality of sub-categories is a first plurality of sub-categories and the plurality of statistical language models is a first plurality of statistical language models, and training at least one statistical language model further comprises, when it is determined that the evaluated interpretation accuracy of the first language model configuration is less than the desired accuracy:
evaluating an interpretation accuracy of the second language model configuration using the test data;
determining whether the evaluated interpretation accuracy of the second language model configuration is less than the desired accuracy;
when it is determined that the evaluated interpretation accuracy of the second language model configuration is at least the desired accuracy, then adopting the second language model configuration; and
when it is determined that the evaluated interpretation accuracy of the second language model configuration is less than the desired accuracy, then:
further sub-dividing the first plurality of sub-categories of the application categorization into a second plurality of sub-categories; and
building a third language model configuration comprising a second plurality of statistical language models corresponding to the second plurality of sub-categories.

14. A natural language understanding (NLU) system comprising:
a computer comprising at least one processor configured to perform acts of:
categorizing an NLU application to produce an application categorization having a plurality of categories;
classifying an NLU database corpus of example expressions to produce a classified corpus by identifying at least one of the categories for each example expression of the example expressions; and
building from the classified corpus a first language model configuration comprising a first statistical language model;
evaluating an interpretation accuracy of the first language model configuration using test data;
determining whether the evaluated interpretation accuracy is less than a desired accuracy;
when it is determined that the evaluated interpretation accuracy is at least the desired accuracy, then adopting the first language model configuration; and
when it is determined that the evaluated interpretation accuracy is less than the desired accuracy, then:
sub-dividing the application categorization into a plurality of sub-categories; and
building a second language model configuration comprising a plurality of statistical language models corresponding to the plurality of sub-categories.

15. The NLU system of claim 14, wherein said application categorization includes at least one topic of said natural language understanding application that is presented as one of a category, sub-category and end target for one or more features.

16. The NLU system of claim 14, wherein said classifying partitions said NLU database corpus based on said application categorization.

17. The NLU system of claim 14, further comprising:
a visual toolkit having a graphical user interface (GUI) for visually presenting said application categorization and classifying said NLU database corpus.

18. The NLU system of claim 14, wherein a language input request is processed through at least one language model configuration for yielding a classification result, wherein a target with the highest classification result is selected to provide information in response to the language input request.

19. The NLU system of claim 14, wherein the plurality of sub-categories is a first plurality of sub-categories and the plurality of statistical language models is a first plurality of statistical language models, and when it is determined that the evaluated interpretation accuracy of the first language model configuration is less than the desired accuracy, the computer comprising the at least one processor is further configured to perform acts of:
  evaluating an interpretation accuracy of the second language model configuration using the test data;
  determining whether the evaluated interpretation accuracy of the second language model configuration is less than the desired accuracy;
  when it is determined that the evaluated interpretation accuracy of the second language model configuration is at least the desired accuracy, then adopting the second language model configuration; and
  when it is determined that the evaluated interpretation accuracy of the second language model configuration is less than the desired accuracy, then:
    further sub-dividing the first plurality of sub-categories of the application categorization into a second plurality of sub-categories; and
    building a third language model configuration comprising a second plurality of statistical language models corresponding to the second plurality of sub-categories.

20. A natural language understanding (NLU) system comprising:
  a computer comprising at least one processor configured to perform acts of:
    categorizing an NLU application to produce an application categorization having a plurality of categories;
    classifying an NLU database corpus of example expressions to produce a classified corpus by identifying at least one of the categories for each example expression of the example expressions;
    building from the classified corpus a first language model configuration comprising a first statistical language model;
    evaluating an interpretation accuracy of the first language model configuration using test data;
    determining whether the evaluated interpretation accuracy of the first language model configuration is less than a desired accuracy;
    when it is determined that the evaluated interpretation accuracy of the first language model configuration is at least the desired accuracy, then adopting the first language model configuration; and
    when it is determined that the evaluated interpretation accuracy of the first language model configuration is less than the desired accuracy, then:
      sub-dividing the application categorization into a first plurality of sub-categories;
      building a second language model configuration comprising a first plurality of statistical language models corresponding to the first plurality of sub-categories;
      evaluating an interpretation accuracy of the second language model configuration using the test data;
      determining whether the evaluated interpretation accuracy of the second language model configuration is less than the desired accuracy;
      when it is determined that the evaluated interpretation accuracy of the second language model configuration is at least the desired accuracy, then adopting the second language model configuration; and
      when it is determined that the evaluated interpretation accuracy of the second language model configuration is less than the desired accuracy, then:
        determining whether the first plurality of sub-categories can be further sub-divided;
        when it is determined that the first plurality of sub-categories can be further sub-divided, then:
          further sub-dividing the first plurality of sub-categories of the application categorization into a second plurality of sub-categories; and
          building a third language model configuration comprising a second plurality of statistical language models corresponding to the second plurality of sub-categories; and
        when it is determined that the first plurality of sub-categories cannot be further sub-divided, then adopting a language model configuration selected from the group consisting of the first language model configuration and the second language model configuration, the selected language model configuration having the greatest evaluated interpretation accuracy.

* * * * *